(12) United States Patent
Franks (10) Patent No.: US 7,762,503 B2
(45) Date of Patent: Jul. 27, 2010

(54) CABLE TIE WITH OXYGEN SENSOR CONNECTOR FASTENER

(75) Inventor: John R. Franks, Hopkinton, MA (US)

(73) Assignee: Avery Dennison Corporation, Pasadena, CA (US)

( * ) Notice: Subject to any disclaimer, the term of this patent is extended or adjusted under 35 U.S.C. 154(b) by 91 days.

(21) Appl. No.: 11/407,533

(22) Filed: Apr. 19, 2006

(65) Prior Publication Data

US 2007/0007398 A1    Jan. 11, 2007

Related U.S. Application Data (60) Provisional application No. 60/673,238, filed on Apr. 20, 2005.

(51) Int. Cl.
F16B 15/00    (2006.01)
F16B 45/00    (2006.01)

(52) U.S. Cl. .................. 248/71; 248/49; 248/68.1; 248/69; 248/74.3; 24/458; 24/16 PB; 24/17 AP; 411/400; 411/401

(58) Field of Classification Search .............. 248/49, 248/68.1, 69, 71, 74.3; 24/458, 16 PB, 17 AP; 411/400, 401
See application file for complete search history.

(56) References Cited

U.S. PATENT DOCUMENTS

| | | | | | |
|---|---|---|---|---|---|
| 2,632,217 | A | * | 3/1953 | Flora | 24/16 PB |
| 3,463,427 | A | * | 8/1969 | Fisher | 248/68.1 |
| 3,632,069 | A | * | 1/1972 | Thayer et al. | 248/56 |
| 3,672,615 | A | * | 6/1972 | Fiorentino | 248/74.3 |
| 4,008,512 | A | * | 2/1977 | Prodel | 24/16 PB |
| 4,447,934 | A | * | 5/1984 | Anscher | 24/16 PB |
| 4,648,735 | A | * | 3/1987 | Oddenino | 403/187 |
| 4,705,245 | A | * | 11/1987 | Osada | 248/74.3 |
| 4,805,856 | A | * | 2/1989 | Nicoli et al. | 248/74.3 |
| 4,817,901 | A | * | 4/1989 | Kuo | 248/230.8 |
| 4,875,647 | A | * | 10/1989 | Takagi et al. | 248/74.3 |
| 4,944,475 | A | * | 7/1990 | Ono et al. | 248/71 |
| 5,042,114 | A | * | 8/1991 | Parrish | 24/16 PB |
| 5,065,562 | A | * | 11/1991 | Larsen et al. | 52/772 |
| 5,112,013 | A | * | 5/1992 | Tolbert et al. | 248/74.3 |

(Continued)

FOREIGN PATENT DOCUMENTS

EP    1249652 A1    10/2002

(Continued)

*Primary Examiner*—J. Allen Shriver, II
*Assistant Examiner*—Nkeisha J Smith
(74) *Attorney, Agent, or Firm*—Kriegsman & Kriegsman (57) ABSTRACT

A one-piece cable tie includes a locking head and an attached strap, the locking head being adapted to receive and selectively engage a portion of the strap when the tie is formed into a closed loop. The cable tie additionally includes a fastener formed onto the locking head that is designed for connection with the electrical connector for an oxygen sensor for an automotive emissions control system. The fastener includes a flattened platform that is spaced away from the top surface of the locking head by an inverted T-shaped standoff, the flattened platform being sized and shaped to be slidably disposed within a corresponding slot formed in the electrical connector. A ratchet tooth is formed onto the flat top surface of the platform and is shaped to engage the electrical connector in order to retain the fastener secured within the slot in the electrical connector.

3 Claims, 7 Drawing Sheets

U.S. PATENT DOCUMENTS

| | | | |
|---|---|---|---|
| 5,131,613 A * | 7/1992 | Kamiya et al. | 248/74.3 |
| 5,267,967 A * | 12/1993 | Schneider | 604/174 |
| 5,367,749 A * | 11/1994 | Takeuchi | 24/16 PB |
| 5,368,261 A * | 11/1994 | Caveney et al. | 248/73 |
| 5,601,261 A * | 2/1997 | Koike | 248/71 |
| 5,775,653 A * | 7/1998 | Horney et al. | 248/230.8 |
| 5,848,771 A * | 12/1998 | Hancock-Bogese et al. | 248/74.3 |
| 5,898,134 A * | 4/1999 | Fallin et al. | 174/135 |
| 5,921,510 A * | 7/1999 | Benoit et al. | 248/71 |
| 5,926,921 A * | 7/1999 | Benoit | 24/16 PB |
| 6,253,421 B1 * | 7/2001 | Kraus | 24/16 PB |
| 6,367,745 B1 * | 4/2002 | Winton, III | 248/71 |
| 6,382,570 B1 * | 5/2002 | Simpson et al. | 248/74.3 |
| 6,394,695 B1 * | 5/2002 | Chausset | 403/397 |
| 6,550,723 B2 * | 4/2003 | Fraley et al. | 248/74.3 |
| 6,572,317 B2 * | 6/2003 | Okada et al. | 411/508 |
| 6,669,426 B1 * | 12/2003 | Detter et al. | 411/510 |
| 6,715,185 B2 * | 4/2004 | Angellotti | 24/297 |
| 6,749,157 B2 * | 6/2004 | Takeuchi | 248/71 |
| 6,764,050 B2 * | 7/2004 | Takenaga | 248/71 |
| 6,835,893 B2 * | 12/2004 | Whipple | 174/135 |
| 6,923,407 B2 * | 8/2005 | Takeuchi | 248/73 |
| 6,974,292 B2 * | 12/2005 | Hansen | 411/508 |
| 7,107,653 B2 * | 9/2006 | Thompson | 24/16 PB |
| 7,152,281 B2 * | 12/2006 | Scroggie | 24/297 |
| 7,229,052 B2 * | 6/2007 | Takeuchi | 248/71 |
| 2002/0104196 A1 * | 8/2002 | Geiger | 24/16 PB |
| 2003/0075647 A1 | 4/2003 | Takenaga | |
| 2006/0239796 A1 * | 10/2006 | Franks | 411/455 |
| 2007/0023586 A1 * | 2/2007 | Geiger | 248/71 |
| 2007/0101551 A1 * | 5/2007 | Thompson | 24/16 PB |
| 2007/0102594 A1 * | 5/2007 | Geiger et al. | 248/71 |

FOREIGN PATENT DOCUMENTS

GB 2372293 A 8/2002

* cited by examiner

CABLE TIE WITH OXYGEN SENSOR CONNECTOR FASTENER

CROSS-REFERENCE TO RELATED APPLICATIONS

The present application claims the benefit under 35 U.S.C. 119(e) of U.S. provisional Patent Application Ser. No. 60/673,238, filed Apr. 20, 2005, the disclosure of which is incorporated herein by reference.

BACKGROUND OF THE INVENTION

The present invention relates generally to the automotive industry and more particularly to oxygen sensors used in the automotive industry.

Directives for monitoring the exhaust emissions of automotive vehicles have recently grown into prominence in an effort to minimize the pollutant effects that automobiles introduce into the environment (i.e., with respect to air quality). In particular, federal law currently mandates that all manufactured automobiles be equipped with an emissions control system which functions, among other things, to help an automotive engine (i) run as efficiently as possible and (ii) produce as few emissions as possible. One or more oxygen sensors are typically provided as part of an automotive emissions control system, each oxygen sensor serving to monitor the air-fuel mixture of an automobile engine by measuring the amount of oxygen present in the exhaust gas.

Figure 1:
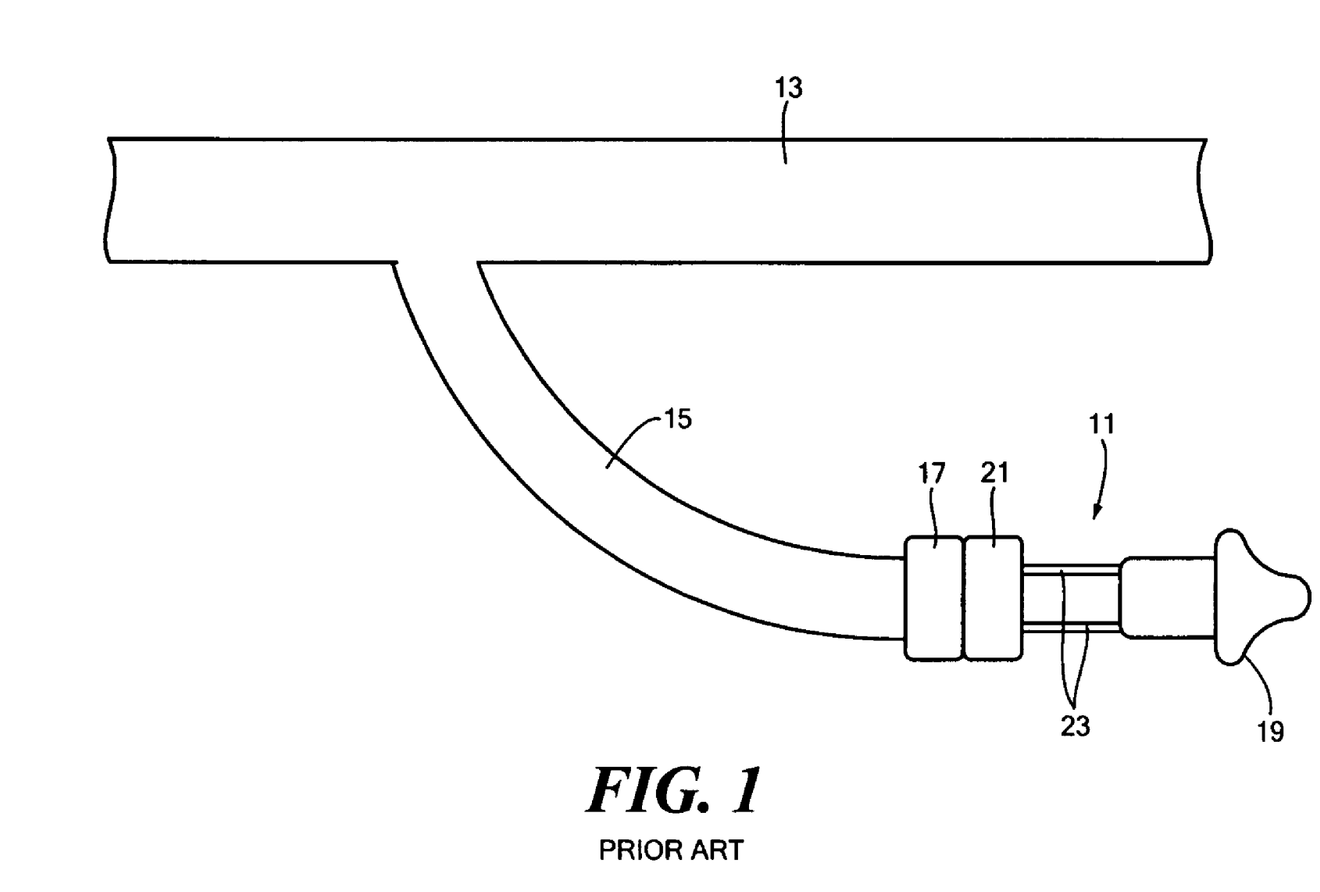
FIG. 1 is simplified prior art schematic representation of a conventional oxygen sensor that is connected to the wire harness for the electrical system of an automobile.

An oxygen sensor is typically disposed in an automobile's exhaust pipe and is electrically coupled to the main electrical system for the automobile through one or more connective elements. Referring now to FIG. 1, there is shown a simplified prior art schematic view of how a conventional oxygen sensor 11 connects to the main electrical system of an automobile. Specifically, the main electrical system typically includes an elongated wire harness 13 which comprises a plurality of individual electrical wires. A electrical cable 15 designated for the oxygen sensor is electrically connected to wire harness 13 and extends out therefrom. The free end of electrical cable 15 is provided with an electrical connector 17 which is designed to electrically mate with a complementary connector provided as part of oxygen sensor 11, as will be described further below.

Oxygen sensor 11 includes an oxygen probe 19 which is electrically coupled to an electrical connector 21 by means of a plurality of wires 23. As can be appreciated, connector 21 is designed to electrically and mechanically engage with connector 17 (e.g., connectors 17 and 21 may be of the male/female variety). In this manner, oxygen sensor 11 can be electrically coupled to cable 15 and, in turn, the main electrical system for the automobile.

It has been found that, due to the substantial length of electrical cable 15, oxygen sensor 11 is rendered highly susceptible to rattling within the automobile body during operation of the car, which is highly undesirable. Accordingly, it is an object of the present invention to provide a means for minimizing the movement (i.e., rattling) of oxygen sensor 11 within the automobile body.

SUMMARY OF THE INVENTION

It is an object of the present invention to provide a new and improved one-piece cable tie which includes a serrated strap fitted to an apertured head.

It is another object of the present invention to provide a cable tie of the type as described above which further includes a fastener that is designed for connection with an oxygen sensor.

It is yet another object of the present invention to provide a cable tie of the type as described above which includes a limited number of parts, which is easy to use and which is inexpensive to manufacture.

Accordingly, there is provided a cable tie comprising (a) a head shaped to include an elongated strap accepting channel, the head comprising a locking member which is disposed to project into the strap accepting channel, (b) a strap having a first end and a second end, the first end being formed onto the head, the strap being sized and shaped to be inserted into the strap accepting channel so that the cable tie forms a closed loop, the strap being adapted to be engaged by the locking member when the cable tie is formed into a closed loop, and (c) a fastener coupled to at least one of the head and the strap, the fastener being designed for connection with an oxygen sensor, said fastener comprising (i) a platform, and (ii) a projection formed on the platform.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the present invention and, together with the description, serve to explain the principles of the invention. In the drawings, wherein like reference numerals represent like parts.

DETAILED DESCRIPTION OF A PREFERRED EMBODIMENT

Figure 2:
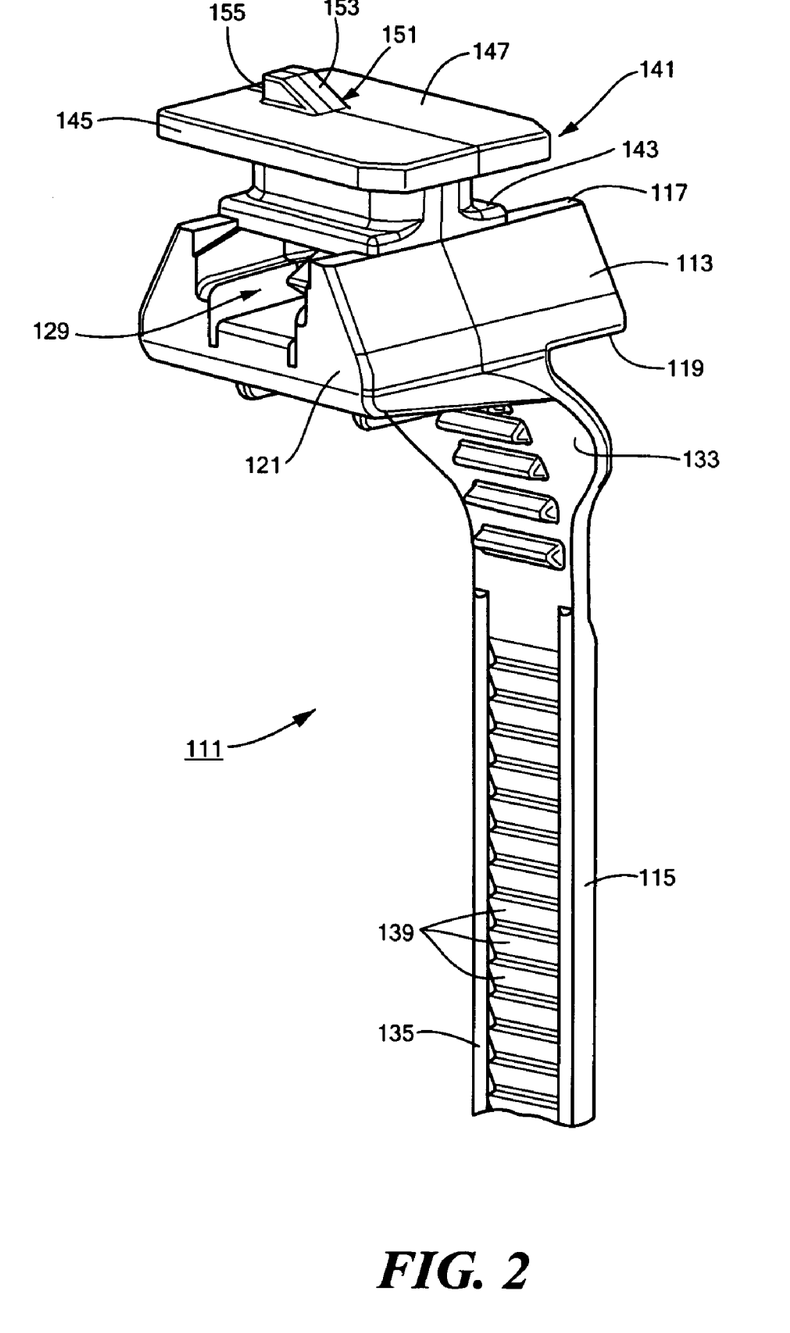
FIG. 2 is a fragmentary perspective view of a cable tie constructed according to the teachings of the present invention, the cable tie including a fastener designed for connection with the conventional oxygen sensor shown in FIG. 1.
Figure 3:
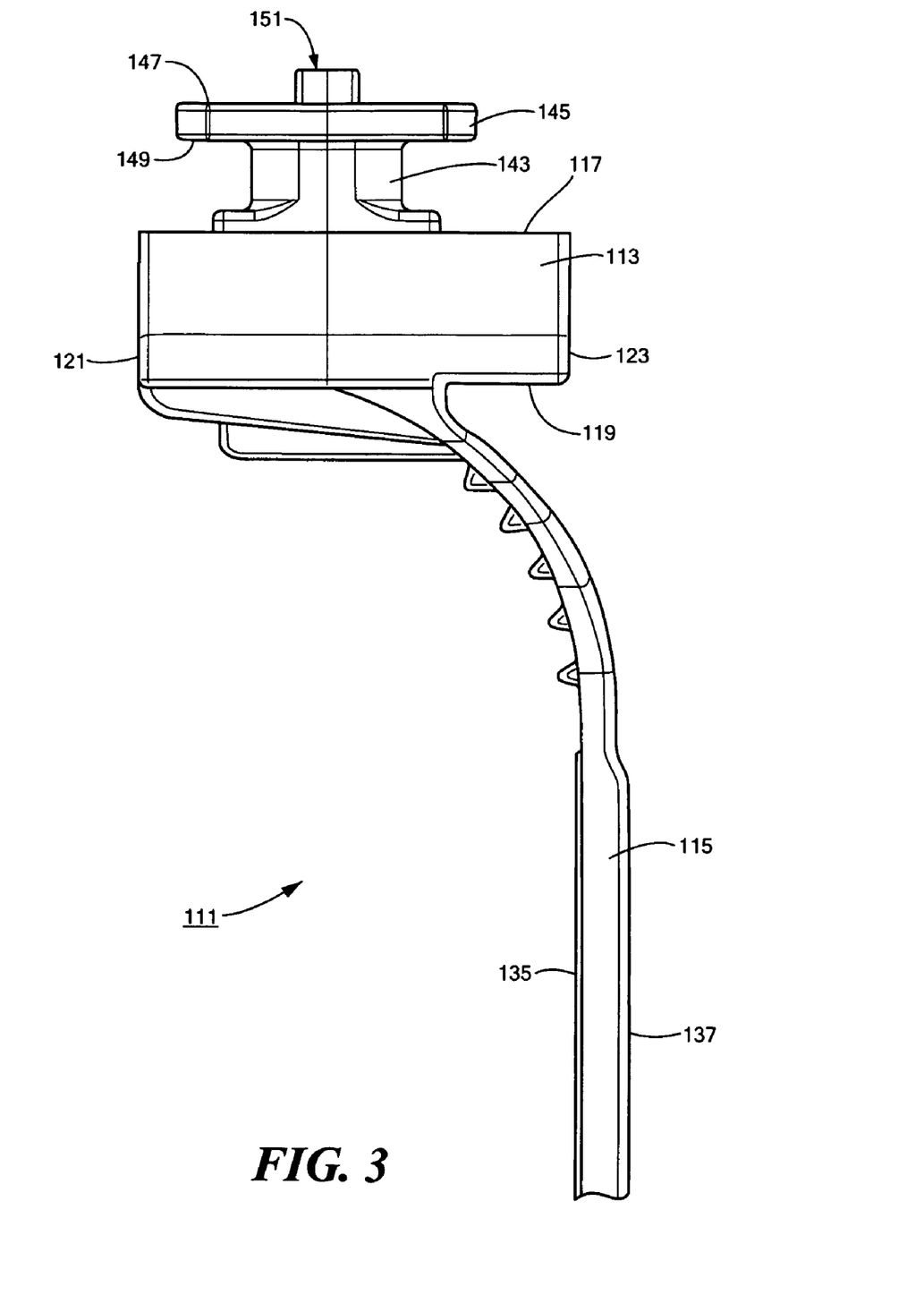
FIG. 3 is a fragmentary right side view of the cable tie shown in FIG. 2.
Figure 4:
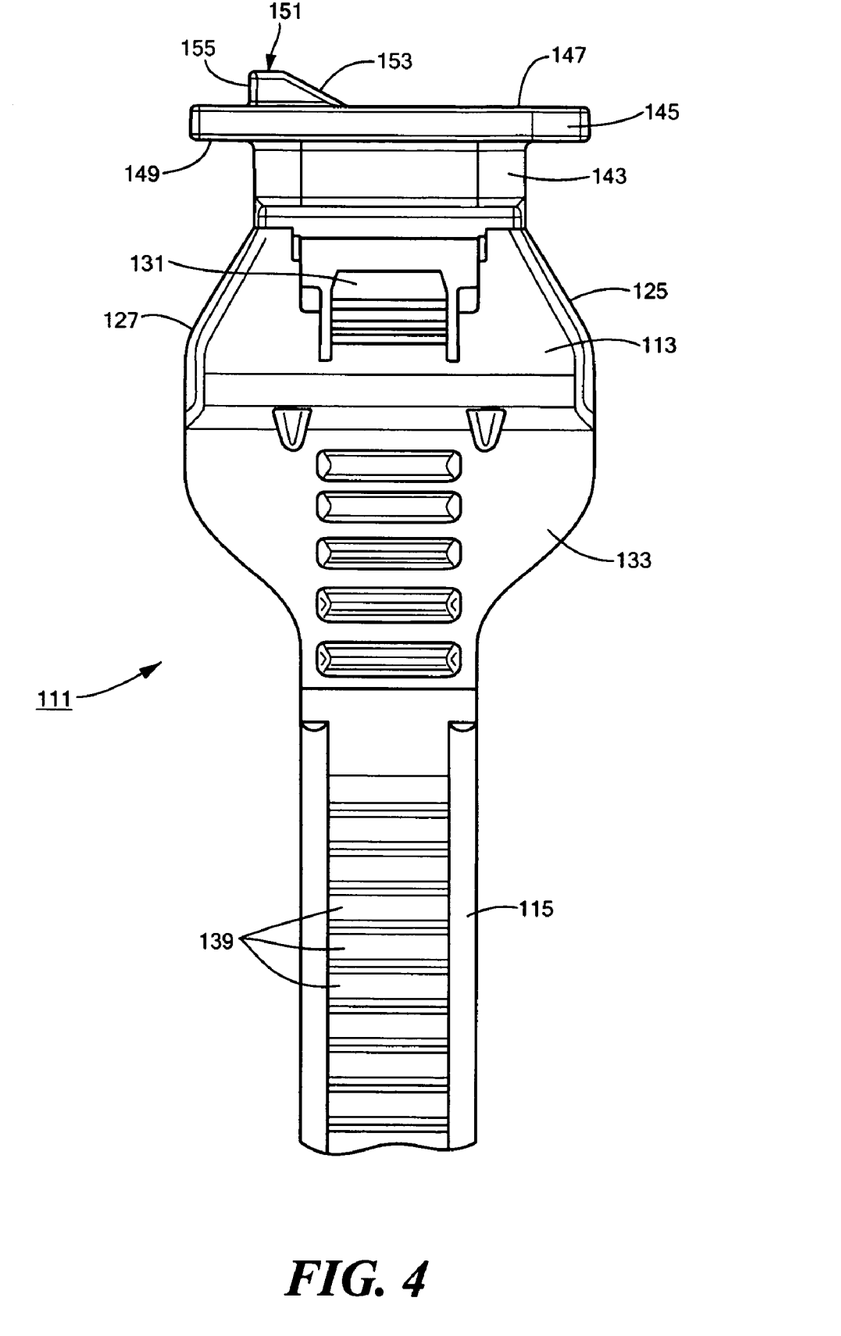
FIG. 4 is a fragmentary front plan view of the cable tie shown in FIG. 2.

Referring now to FIGS. 2-4, there is shown a cable tie (also referred to herein simply as a tie) which is constructed according to the teachings of the present invention, the tie being identified generally as reference numeral 111. As will be described further in detail below, tie 111 is designed for connection with an electrical connector for an oxygen sensor for an automotive emissions control system. In turn, tie 111 can be used to retain the electrical connector against a wire harness for the automobile's electrical system.

Cable tie 111 comprises a locking head 113 and an attached strap 115. Preferably, tie 111 is manufactured of a plastic material, such as nylon, and is formed as a single piece using conventional molding techniques.

Locking head 113 is generally rectangular in shape and comprises an open top wall 117, a bottom wall 119, a front wall 121, a rear wall 123, a first side wall 125 and a second side wall 127. Together, top wall 117, bottom wall 119, front wall 121, rear wall 123, first side wall 125 and second side wall 127 at least partially define a strap accepting channel 129 which extends transversely through head 113 from front wall 121 to rear wall 123.

Locking head 113 is shaped to include a pivotable locking pawl, or tang, 131 which projects into strap accepting channel 129. As can be appreciated, with strap 115 inserted into channel 129, locking pawl 131 is designed to engage strap 115 to secure tie 111 in its closed loop configuration.

Strap 115 is an elongated flexible member which is generally uniform and rectangular in lateral cross-section. However, it is to be understood that strap 115 could be constructed in alternative sizes and shapes without departing from the spirit of the present invention.

Strap 115 comprises a first end 133, a second end (not shown), a front surface 135 and a rear surface 137. First end 133 of strap 115 is integrally connected to bottom wall 119 of head 113 so as to render tie 111 a unitary device. Strap 115 further includes a plurality of ratchet-shaped teeth 139 formed along the length of front surface 135, teeth 139 being adapted to be engaged by locking pawl 131 when tie 111 is formed into a closed loop.

In use, cable tie 111 can used in the following manner to bundle together a plurality of wires. Specifically, with the plurality of wires grouped together, strap 115 is wrapped around the bundle. The second end of strap 115 is then inserted through strap accepting channel 129 in locking head 113 so as to form a closed loop around the bundle. With cable tie 111 formed into a closed loop, the second end of strap 115 is further advanced through locking head 113 to cinch the cable tie strap 115 tightly around the bundle. Having cinched strap 115 tightly around the bundle, internal pawl 131 lockably engages a serration 139 on strap 115 to prevent strap 115 from being backed out of apertured head 113. In this manner, the engagement of internal pawl 131 onto the serrated strap 115 secures cable tie 111 in its closed loop configuration around the desired bundle.

Cable tie 111 additionally includes a unitary fastener 141 which is integrally formed onto top wall 117 of locking head 113. As will be described in detail below, fastener 141 is sized and shaped to lockably engage with connector 21 of oxygen sensor 11. It should be noted that the integration of fastener 141 onto locking head 113 of cable tie 111 serves as the principal novel feature of the present invention.

Fastener 141 includes a standoff 143 that is integrally formed onto top wall 117 of locking head 113, standoff 143 having an inverted T-shaped configuration in lateral cross-section. As seen most clearly in FIG. 2, standoff 143 serves to partially enclose strap accepting channel 129.

Fastener 141 additionally includes a substantially flat platform 145 that is integrally formed onto the free end of standoff 143. In this manner, it is to be understood that standoff 143 serves to space platform 145 adequately away from top wall 117 in a parallel relationship relative thereto.

Platform 145 includes a substantially flat top surface 147 and a substantially flat bottom surface 149. As seen most clearly in FIG. 3, top and bottom surfaces 147 and 149 of platform 145 are disposed substantially in parallel with top wall 117.

A ratchet-shaped projection 151 is formed onto top surface 147 of platform 145. Projection 151 includes an angled, or tapered, surface 153 that extends at an acute angle relative to top surface 147 of platform 145 and a vertical abutment surface 155 that extends at a right angle relative to top surface 147 of platform 145. As will be described further below, projection 151 is designed to engage connector 21 of oxygen sensor 11 to help retain fastener 141 in securement therewith.

Figure 5:
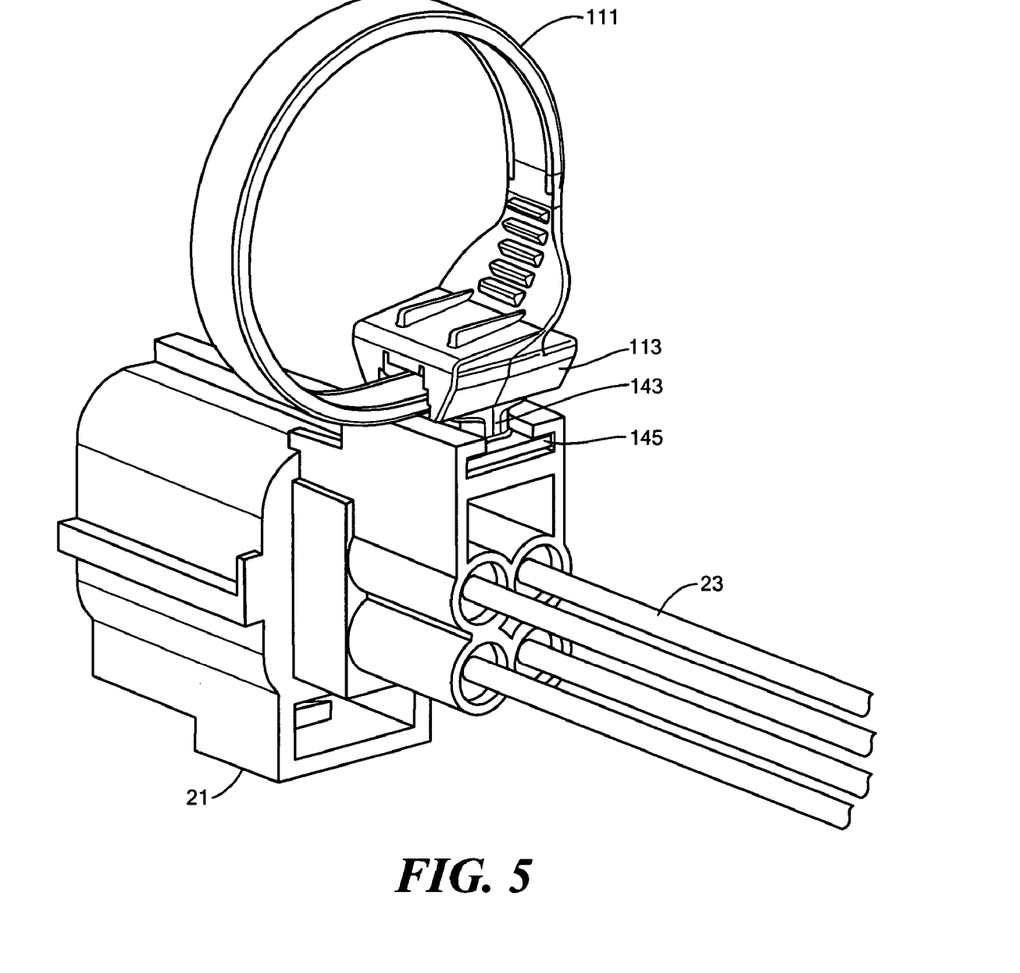
FIG. 5 is a perspective view of the cable tie shown FIG. 2, the cable tie being shown formed into a closed loop and coupled to the connector for the oxygen sensor shown in FIG. 1.
Figure 6:
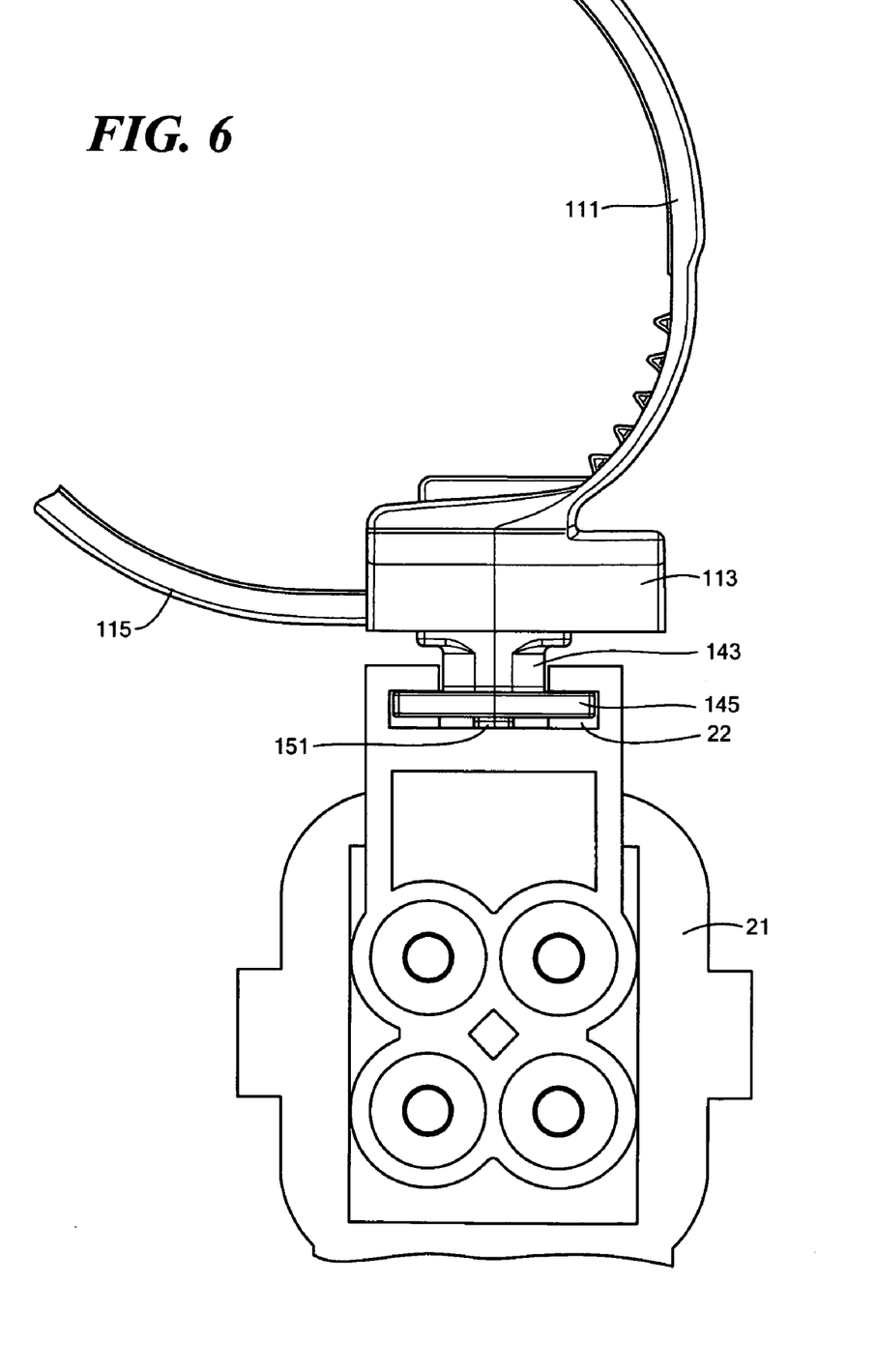
FIG. 6 is an enlarged, fragmentary, end view of the cable tie and oxygen sensor shown in FIG. 5.

Specifically, referring now to FIGS. 5 and 6, fastener 141 is shown coupled to connector 21 of an oxygen sensor 11. Connector 21 is standard in its construction and is shaped to define a narrow slot 22. In order couple fastener 141 to connector 21, platform 145 is inverted (i.e., such that top surface 147 is directed down towards wires 23) and is slid longitudinally within slot 22. Due to the construction of tapered surface 153 of projection 151, platform 145 can be slid within slot 22 using a minimal insertion force, which is highly desirable. With platform 145 slid sufficiently into slot 22, it is to be understood that vertical surface 155 of projection 151 abuts against an internal wall formed within slot 22 to prevent platform 145 from being withdrawn (i.e., backed out) from slot 22. In this manner, projection 151 serves to retain fastener 141 coupled to connector 21, which is highly desirable.

Figure 7:
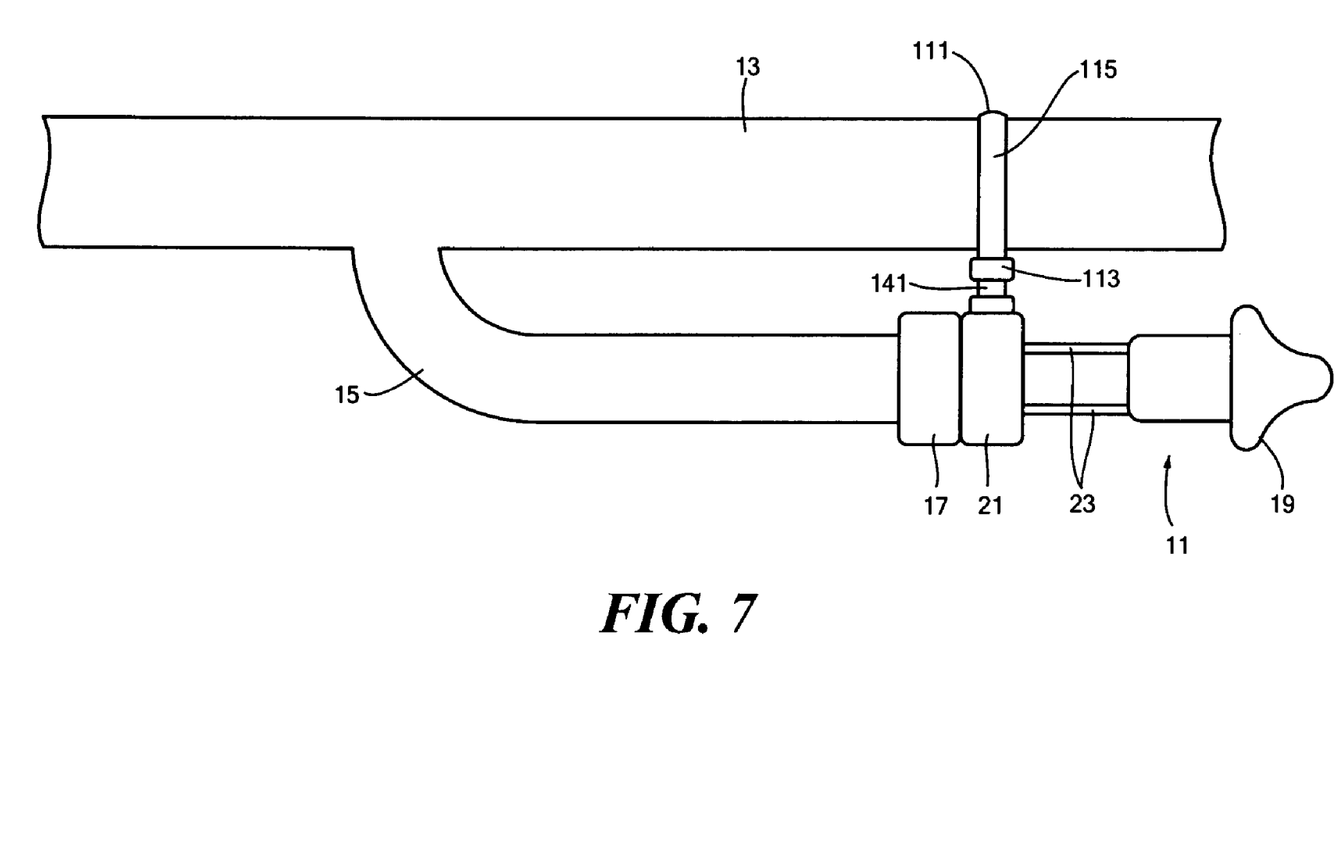
FIG. 7 is a simplified schematic representation of the cable tie shown in FIG. 2 being used to secure an oxygen sensor to the wire harness for the main electrical system of an automobile.

Accordingly, as seen most clearly in FIG. 7, cable tie 111 can be used in the following manner to retain connector 21 of oxygen sensor 11 against the wire harness 13 for the main electrical system of an automobile. Specifically, fastener 141 is first coupled to connector 21 in the manner described in detail above. With fastener 141 coupled to connector 21, strap 115 is wrapped around harness 13 and is inserted through strap accepting channel 129 of locking head 113 so as to form a closed loop. As can be appreciated, further advancement of strap 115 through apertured head 113 serves to cinch strap 115 tightly around harness 13, with locking pawl 131 sequentially engaging teeth 139 to retain strap 115 wrapped tightly around harness 13. In this manner, cable tie 111 serves to retain connector 21 (and, as a consequence, oxygen sensor 11) securely against harness 13, which is a principal object of the present invention.

The embodiment of the present invention described above is intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A cable tie comprising:
   (a) a head shaped to include a top wall, a bottom wall, a front wall, a rear wall, a first sidewall and a second sidewall which together at least partially define an elongated strap accepting channel, the head comprising a locking member which is disposed to project into the strap accepting channel;

(b) a strap having a first end and a second end, the first end being formed onto the head, the strap being sized and shaped to be inserted into the strap accepting channel so that the cable tie forms a closed loop, the strap being adapted to be engaged by the locking member when the cable tie is formed into a closed loop; and (c) a unitary fastener coupled to the top wall of the head, said fastener comprising, (i) a planar platform comprising a flat top surface and a flat bottom surface, (ii) a rigid, nonmovable wedged-shaped ratchet tooth formed on the top surface of the platform, the ratchet tooth comprising a tapered surface that is integrally formed onto and extends at an acute angle away from the top surface of the platform and an exposed abutment surface that is integrally formed onto and extends at a right angle away from the top surface of the platform, and (iii) a standoff having an inverted T-shaped configuration in lateral cross-section for spacing the platform away from the top wall of the head.

2. The cable tie as claimed in claim 1 wherein the cable tie is constructed as a unitary plastic member.

3. The cable tie as claimed in claim 2 wherein the first end of the strap is formed onto the bottom wall of the head.

* * * * *